July 12, 1932. A. BAECK 1,867,438

TIRE

Filed Oct. 23, 1931

WITNESSES

INVENTOR
Adolph Baeck
BY
ATTORNEYS

Patented July 12, 1932

1,867,438

UNITED STATES PATENT OFFICE

ADOLPH BAECK, OF LAKE RONKONKOMA, NEW YORK

TIRE

Application filed October 23, 1931. Serial No. 570,716.

This invention relates to tires, an object of the invention being to provide an improved resilient tire which is designed to supplant the ordinary inflated pneumatic or cushion tire, and which is in effect a duplex solid tire comprising an inner annular cushion of soft rubber and an outer annular shoe or wearing section composed of any suitable reinforced tougher, harder material than the inner cushioning member.

A further object is to provide means whereby the inner cushioning member is permitted to expand, under pressure, so as to give the maximum resiliency to the tire.

A further object is to provide a tire of this character in which a rim of general channel-shape in cross section is employed having therein a circular series of pins spaced apart and spaced from the base of the channel and on which pins the soft cushioning member of the tire rests, so that when pressure is applied on the tire there is a space for expansion or bulging of the cushioning member between the pins.

A further object is to provide a tire of this character which will greatly cheapen the cost of installation and operation of vehicle tires, and yet that will most efficiently perform the functions for which it is intended.

With these and other objects in view, the invention consists in certain novel features of construction and combinations and arrangements of parts, all of which will be more fully hereinafter described and pointed out in the claims.

In the accompanying drawing—

Figure 1:
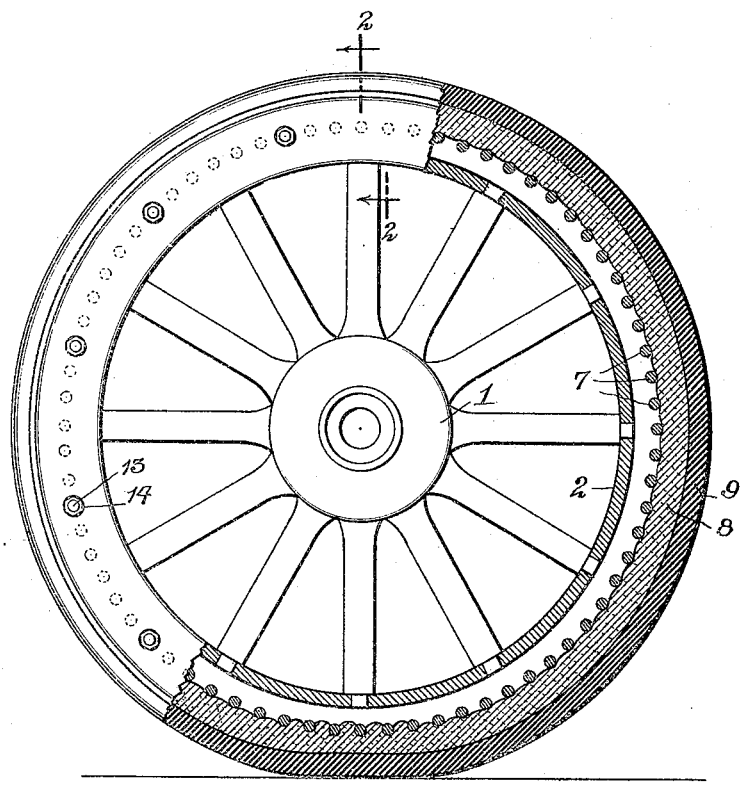
Figure 2:
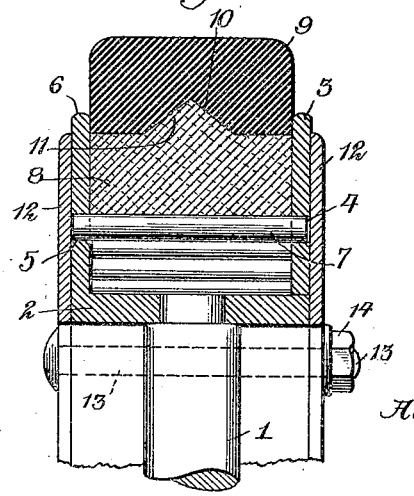

Figure 1 is a view partly in side elevation and partly broken away and in section illustrating my improved tire; and Figure 2 is an enlarged view in section on the staggered line 2/2 of Figure 1.

1 represents a wheel having a felloe or rim 2 thereon, which is of general channel-shape in cross section. I shall hereinafter refer to this part 2 as a rim, as it constitutes in effect a rim for the support of my duplex tire but, of course, it is to be understood that this portion may be connected directly to the spokes of the wheel or there may be a felloe interposed between, or any other wheel construction may be employed with this type of rim 2.

The channel-shaped rim 2 has at least one removable flange member 3, which constitutes a ring and is provided with a circular series of openings 4 registering with a circular series of openings 5 in a fixed flange member 6 of the rim.

Removable pins 7 have their ends mounted in the openings 4 and 5 and form a circular series of supports, which are spaced apart and which are spaced from the base of the channel-shaped member or rim 2.

My improved duplex tire comprises an inner annular soft rubber member 8, which rests upon the pins 7, and an outer shoe or wearing member 9 composed of reinforced rubber of greater strength and durability than the soft rubber 8. These members 8 and 9 of the duplex tire may constitute separate members or they may be secured together in any way desired, and as illustrative of one means for preventing lateral movement of one of the members relative to the other I show the outer member 8 as having an internal annular groove 10 in which an annular enlargement 11 on the inner member 8 is positioned.

I also preferably provide removable plates or rings 12 located at the sides of the rim 2 confining the ends of the pins 7 and secured to the rim in any approved manner. As illustrative of a securing means I have shown bolts and nuts 13 and 14 respectively, extending through the rim and securing the plates or rings 12 in position. These bolts 13 may constitute supporting pins, in addition to their function as bolts.

My improved tire operates upon the principle that it is necessary to provide a space for the expansion of the soft rubber inner member in order to give the necessary resiliency to the tire. This space is provided by reason of the fact that the pins 17 engaged by the soft rubber member 8 are spaced apart and there is a space between said pins and the base of the channel-shaped rim 2. This is illustrated clearly in Figure 1 of the drawing, where it will be seen at the lower portion of this figure a soft rubber inner member is expanded or forced between the pins. Furthermore, it will be seen that by reason of this construction there is no possibility of the tire slipping on the rim as the pins serve as keys to hold the tire against such action and insure a perfect traction.

While I have illustrated what I believe to be the preferred embodiment of my invention, it is to be distinctly understood that various slight changes may be made with regard to the form and arrangement of parts without departing from my invention, and hence I do not limit myself to the precise details set forth but consider myself at liberty to make such changes and alterations as fairly fall within the spirit and scope of the claims.

What I claim is:

1. The combination with a rim, of a circular series of pins supported in the rim, and a duplex tire mounted on the pins and comprising two annular members, the inner annular member being of soft resilient material and the outer annular member of harder, greater wearing material.

2. The combination with a rim of general channel-shape in cross section, one flange of said rim constituting a removable ring and both flanges of said channel having registering openings, pins located in the said openings, plates removably secured to the rim and holding the pins against displacement, and a duplex tire located in the rim supported on the pins and having an inner cushioning portion.

ADOLPH BAECK.